(12) United States Patent
Devore et al.

(10) Patent No.: US 10,934,845 B2
(45) Date of Patent: Mar. 2, 2021

(54) DUAL COOLING AIRFLOW TO BLADES

(71) Applicant: United Technologies Corporation, Farmington, CT (US)

(72) Inventors: Matthew A Devore, Rocky Hill, CT (US); Jonathan Ortiz, El Centro, CA (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/794,900

(22) Filed: Feb. 19, 2020

(65) Prior Publication Data

US 2020/0182060 A1 Jun. 11, 2020

Related U.S. Application Data

(63) Continuation of application No. 15/483,752, filed on Apr. 10, 2017, now Pat. No. 10,718,213.

(51) Int. Cl.
*F01D 5/08* (2006.01)
*F01D 5/18* (2006.01)

(52) U.S. Cl.
CPC ............ *F01D 5/081* (2013.01); *F01D 5/082* (2013.01); *F01D 5/187* (2013.01); *F05D 2240/303* (2013.01); *F05D 2240/304* (2013.01); *F05D 2240/81* (2013.01); *F05D 2260/14* (2013.01); *F05D 2260/201* (2013.01); *Y02T 50/60* (2013.01)

(58) Field of Classification Search
CPC .......... F01D 5/081; F01D 5/082; F01D 5/187; F05D 2240/303; F05D 2260/201; F05D 2240/81; F05D 2260/14; F05D 2240/304
See application file for complete search history.

(56) References Cited

U.S. PATENT DOCUMENTS 4,217,755 A 8/1980 Williams
4,882,902 A * 11/1989 Reigel ..................... F01D 5/082
                                                    60/806
4,940,388 A 7/1990 Lilleker et al.
(Continued)

FOREIGN PATENT DOCUMENTS

EP 3179033 6/2017
JP 57013201 1/1982

OTHER PUBLICATIONS

European Patent Office, European Search Report dated Aug. 20, 2018 in Application No. 18164539.1-1006.
(Continued)

*Primary Examiner* — Eldon T Brockman
(74) *Attorney, Agent, or Firm* — Snell & Wilmer L.L.P.

(57) ABSTRACT

An airfoil may comprise a root and an airfoil body radially outward of the root. The airfoil body may define a first cooling chamber and a second cooling chamber. A first passage may be defined within the root and configured to direct a first airflow radially outward through the root into the first cooling chamber. A second passage may be defined within the root and configured to direct a second airflow radially outward through the root and into the second cooling chamber. A tangential onboard injector (TOBI) may be disposed in the first airflow path. A radial onboard injector (ROBI) may be disposed in the second airflow path.

19 Claims, 7 Drawing Sheets

(56) References Cited

U.S. PATENT DOCUMENTS

| | | | |
|---|---|---|---|
| 6,183,193 B1* | 2/2001 | Glasspoole | F01D 5/08 |
| | | | 415/115 |
| 6,468,032 B2 | 10/2002 | Patel | |
| 7,870,742 B2* | 1/2011 | Lee | F01D 5/088 |
| | | | 60/782 |
| 10,107,109 B2* | 10/2018 | McCaffrey | F01D 5/081 |
| 2006/0104808 A1 | 5/2006 | Dailey | |
| 2008/0112791 A1 | 5/2008 | Lee et al. | |
| 2008/0112793 A1* | 5/2008 | Lee | F01D 5/088 |
| | | | 415/115 |
| 2016/0215628 A1 | 7/2016 | Spangler et al. | |
| 2017/0082026 A1* | 3/2017 | Zelesky | F01D 5/082 |
| 2017/0167271 A1* | 6/2017 | McCaffrey | F01D 5/187 |

OTHER PUBLICATIONS

USPTO, Pre Interview First Office Action dated Jun. 17, 2019 in U.S. Appl. No. 15/483,752.
USPTO, First Action Interview Office Action dated Aug. 29, 2019 in U.S. Appl. No. 15/483,752.
USPTO, Notice of Allowance dated Nov. 19, 2019 in U.S. Appl. No. 15/483,752.

* cited by examiner

DUAL COOLING AIRFLOW TO BLADES

CROSS REFERENCE TO RELATED APPLICATIONS

This application is a continuation of, and claims priority to, and the benefit of U.S. patent application Ser. No. 15/483,752, filed on Apr. 10, 2017, and entitled "DUAL COOLING AIRFLOW TO BLADES" which is incorporated by reference herein in its entirety.

FIELD

The present disclosure relates to cooling systems for gas turbine engines, and more specifically, to blade cooling systems.

BACKGROUND

A gas turbine engine typically includes a fan section, a compressor section, a combustor section, and a turbine section. A fan section may drive air along a bypass flow path while a compressor section may drive air along a core flow path. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines. The turbine section includes multiple stages of blades and vanes. As fluid flows through the turbine section, the flow causes the blades to rotate about an axis of rotation. The vanes, positioned between each row of blades, are used to redirect the flow in order to maximize the power received by the downstream blades.

Temperatures within the turbine section may be relatively high, as the flow of fluid is received initially from the combustor section of the gas turbine engine. Cooling air may be extracted from the compressor section and used to cool the gas path components. Cooled components may include, for example, rotating blades and stator vanes in the turbine section.

SUMMARY

An airfoil is disclosed, comprising a root, an airfoil body radially outward of the root, the airfoil body defining a first cooling chamber and a second cooling chamber, a first passage defined within the root and configured to direct a first airflow received from a tangential onboard injector (TOBI) radially outward through the root into the first cooling chamber, and a second passage defined within the root and configured to direct a second airflow received from a radial onboard injector (ROBI) radially outward through the root and into the second cooling chamber. The TOBI is disposed radially outward from the ROBI. The first cooling chamber is disposed forward from the second cooling chamber.

In various embodiments, the airfoil further comprises a first inlet defined in an axially forward surface of the root. The airfoil may further comprise a second inlet defined in an axially aft surface of the root. The airfoil may further comprise a leading edge and a trailing edge, wherein the first cooling chamber is disposed at the leading edge and the second cooling chamber is disposed at the trailing edge. The airfoil body may define a first plurality of holes at the leading edge, and wherein the first airflow is directed out the airfoil through the first plurality of holes. The airfoil body may define a second plurality of holes at the trailing edge, and wherein the second airflow is directed out the airfoil through the second plurality of holes. The airfoil may comprise a blade.

An engine section of a gas turbine engine is disclosed, comprising a disk configured to rotate about an axis, a blade coupled to the disk, the blade defining a first cooling chamber and a second cooling chamber, a first flow guide disposed upstream of the disk, the first flow guide defining a first airflow path and a second airflow path, a first passage configured to direct the first airflow path to the first cooling chamber, a second passage configured to direct the second airflow path to the second cooling chamber, a tangential onboard injector (TOBI) disposed in the first airflow path, and a radial onboard injector (ROBI) disposed in the second airflow path, wherein the TOBI is disposed radially outward from the ROBI, and the first cooling chamber is disposed forward from the second cooling chamber.

In various embodiments, the first passage includes a first inlet defined in an axially forward surface of the disk, the TOBI configured to direct the first airflow path into the first inlet. The second passage may include a second inlet defined in an axially aft surface of the disk, the ROBI configured to direct the second airflow path into the second inlet. The first passage may include a first inlet defined in an axially forward surface of a root. The second passage may include a second inlet defined in an axially aft surface of the disk. The engine section may further comprise a minidisk coupled to an axially aft surface of the disk, wherein the second airflow path is directed radially outward between the minidisk and the axially aft surface of the disk. The blade may define a first plurality of holes at a leading edge, and wherein the first airflow path is directed out the blade through the first plurality of holes.

A gas turbine engine is disclosed, comprising a compressor section configured to supply airflow to at least one of a first airflow path or a second airflow path, a turbine section configured to receive airflow from the first airflow path and the second airflow path. The turbine section comprises a disk configured to rotate about an axis, a blade coupled to the disk, the blade defining a first cooling chamber and a second cooling chamber, a first passage configured to direct a first airflow path to the first cooling chamber, a second passage configured direct the second airflow path to the second cooling chamber, a tangential onboard injector (TOBI) disposed in the first airflow path, and a radial onboard injector (ROBI) disposed in the second airflow path, wherein the TOBI is disposed radially outward from the ROBI, and the first cooling chamber is disposed forward from the second cooling chamber.

In various embodiments, the gas turbine engine further comprises a first flow guide disposed upstream of the disk, the first flow guide defining the first airflow path and the second airflow path and wherein the first passage includes a first inlet defined in an axially forward surface of the disk, the TOBI configured to direct the first airflow path into the first inlet. The second passage may include a second inlet defined in an axially aft surface of the disk, the ROBI configured to direct the second airflow path into the second inlet. The ROBI may be configured to direct the second airflow path radially inward. The gas turbine engine may further comprise a minidisk coupled to an axially aft surface of the disk, wherein the second airflow path is directed radially outward between the minidisk and the axially aft surface of the disk.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, fixed, temporary, partial, full, and/or any other possible attachment option. Any reference related to fluidic coupling to serve as a conduit for cooling airflow and the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. A first component that is "radially outward" of a second component means that the first component is positioned at a greater distance away from the engine central longitudinal axis than the second component. As used herein, "distal" refers to the direction outward, or generally, away from a reference component. As used herein, "proximal" refers to a direction inward, or generally, towards the reference component.

The next generation turbofan engines are designed for higher efficiency and use higher pressure ratios and higher temperatures in the high pressure compressor than are conventionally experienced. These higher operating temperatures and pressure ratios create operating environments that cause thermal loads that are higher than the thermal loads conventionally experienced, which may shorten the operational life of current components.

Blades may include a cooling system, which may direct multiple airflow paths through the body of the blade. A first airflow may be directed into the blade through a disk and may exit the blade through leading edge cooling holes. A second airflow may be directed into the blade through the disk and may exit the blade through trailing edge cooling holes. The first airflow and second airflow may be sourced from different locations in the engine, and may have different temperatures or pressures. One or more flow guides, seals, injectors, and/or flow baffles may be employed to direct the first and second flow paths into the blade.

Figure 1:
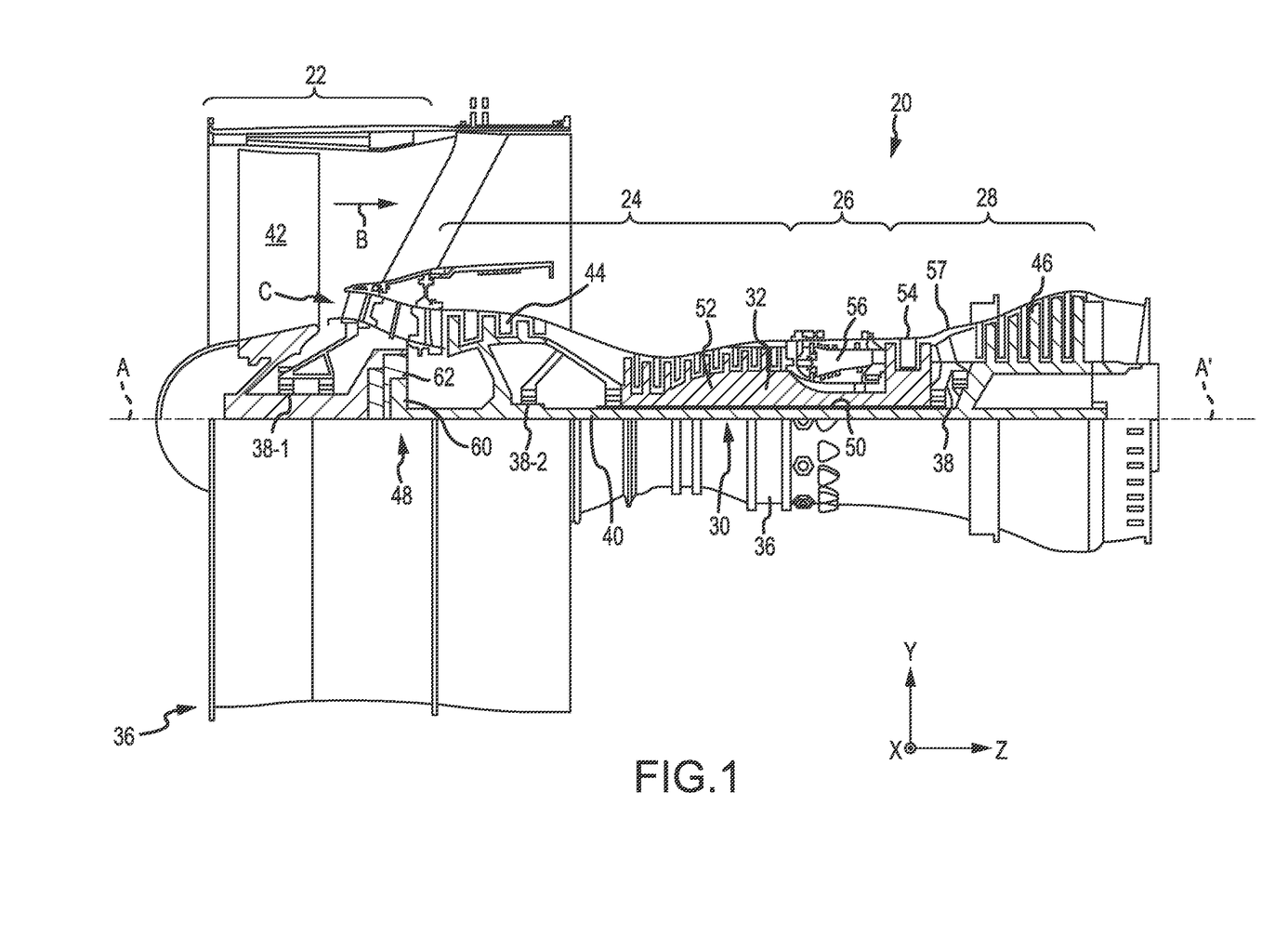
FIG. 1 illustrates a cross-sectional view of an exemplary gas turbine engine, in accordance with various embodiments.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive coolant along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
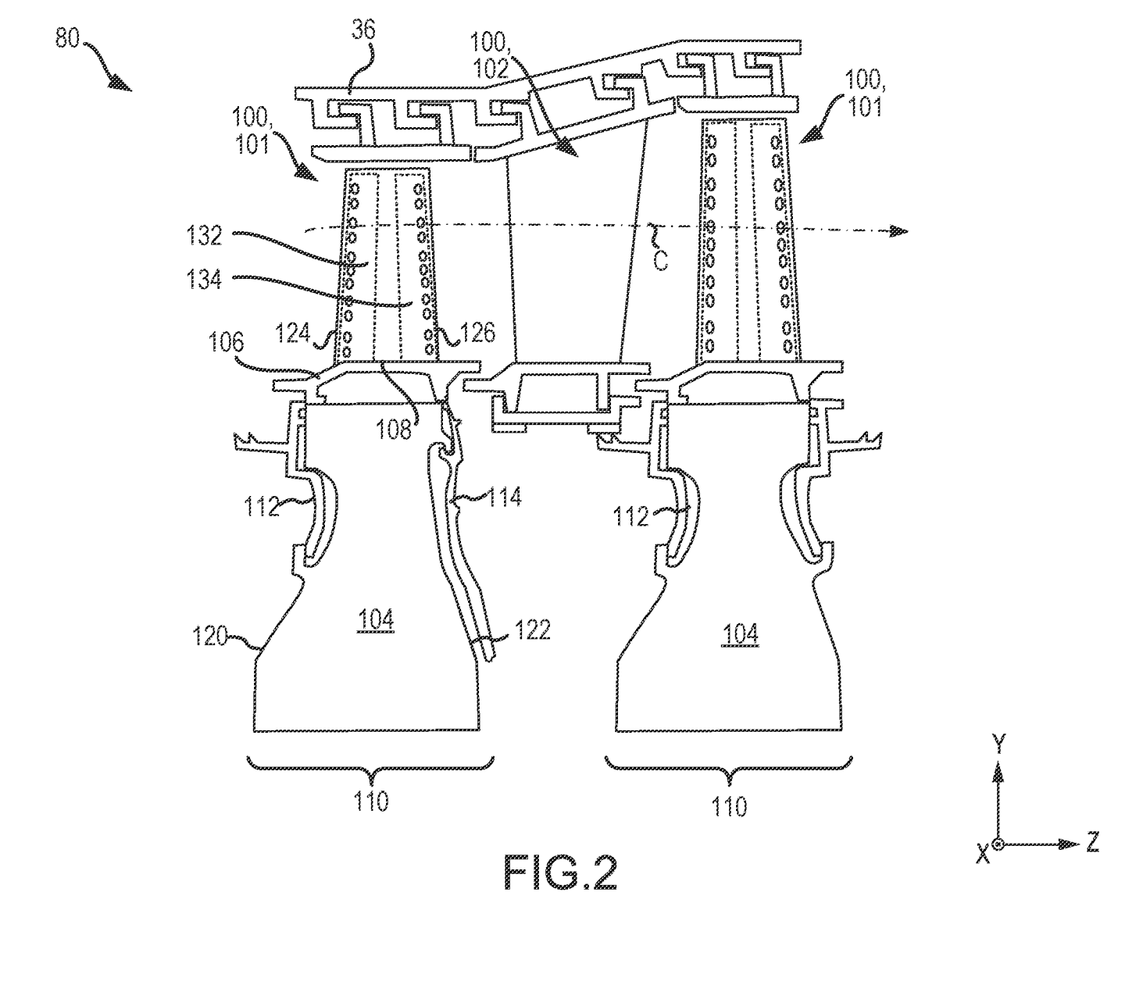
FIG. 2 illustrates a cross-sectional view of an engine section of gas turbine engine, according to various embodiments.

Referring now to FIG. 2 and still to FIG. 1, according to various embodiments, each of low pressure compressor 44, high pressure compressor 52, low pressure turbine 46, and high pressure turbine 54 in gas turbine engine 20 may comprise one or more stages or sets of rotating blades and one or more stages or sets of stationary vanes axially interspersed with the associated blade stages but non-rotating about engine central longitudinal axis A-A'. The compressor and turbine sections 24, 28 may be referred to as rotor assemblies 110. Each compressor stage and turbine stage may comprise multiple interspersed stages of blades 101 and vanes 102. Within the rotor assemblies 110 of gas turbine engine 20 are multiple rotor disks, which may include one or more cover plates or minidisks. The blades 101 rotate about engine central longitudinal axis A-A', while the vanes 102 remain stationary with respect to engine central longitudinal axis A-A'. For example, FIG. 2 schematically shows, by example, a portion of an engine section 80, which is illustrated as a turbine section 28 of gas turbine engine 20. It will be understood that the cooling systems in the present disclosure are not limited to the turbine section, and could extend to other sections of the gas turbine engine 20, including but not limited to compressor section 24.

Engine section 80 may include alternating rows of blades 101 and vanes 102 comprising airfoils that extend into the core flow path C. Vanes 102 may be arranged circumferentially about engine central longitudinal axis A-A'. Vanes 102 direct the core airflow to blades 101 to either add or extract energy. Blades 101 create or extract energy from the core airflow that is communicated through engine section 80 along the core flow path C. In various embodiments, a set of blades 104 may be coupled about a circumference of a generally circular disk 104, which may be disposed radially inward of core flow path C. Disk 104 with blades 101 may be configured to rotate about engine central longitudinal axis A-A'. Disk 104 and blade 101 may comprise a rotor assembly 110 of engine section 80. Each blade 101 may include an attachment or root 106 disposed at an inner diameter 108 of an airfoil body 109. For example, the airfoil body 109 may extend radially outward from the root 106.

Engine section 80 may include a plurality of rotor assemblies 110 with one or more of the rotor assemblies 110 further including one or more cover plates 112 or minidisks 114 coupled to a disk 104. In various embodiments, a cover plate 112 or a minidisk 114 may be coupled to an axial surface of disk 104. For example, a cover plate 112 may be coupled to an axially forward surface 120 of disk 104, and a minidisk 114 may be coupled to an axially aft surface 122 of disk 104. Blades 101 and vanes 102 may generally be referred to as airfoils 100.

In various embodiments, an airfoil 100 may be an internally cooled component of gas turbine engine 20. Each airfoil 100, illustrated as blade 101, has an airfoil body 109 having a leading edge 124 facing a forward direction in the gas turbine engine and a trailing edge 126 facing an aft direction. Airfoil 100 may include a pressure side wall (i.e. having a generally concave surface) and a suction side wall (i.e. having a generally convex surface) joined together at the respective leading edge 124 and trailing edge 126. Airfoil 100 may be configured to accommodate first cooling chamber 132 and second cooling chamber 134 within an airfoil body 105 of airfoil 100.

Figure 3A:
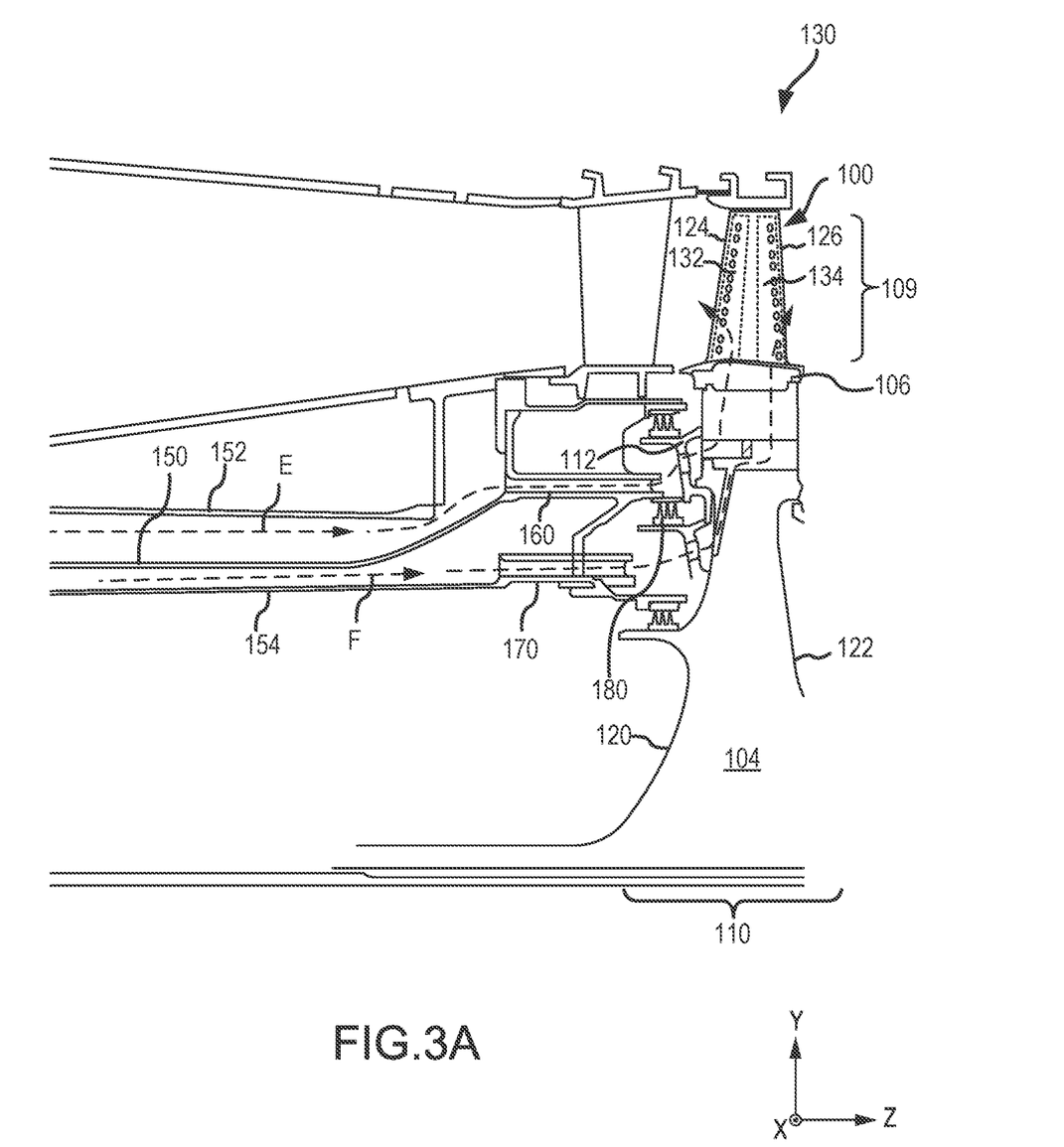
FIGS. 3A and 3B illustrate cross-sectional views of a cooling system for an airfoil, in accordance with various embodiments.
Figure 3B:
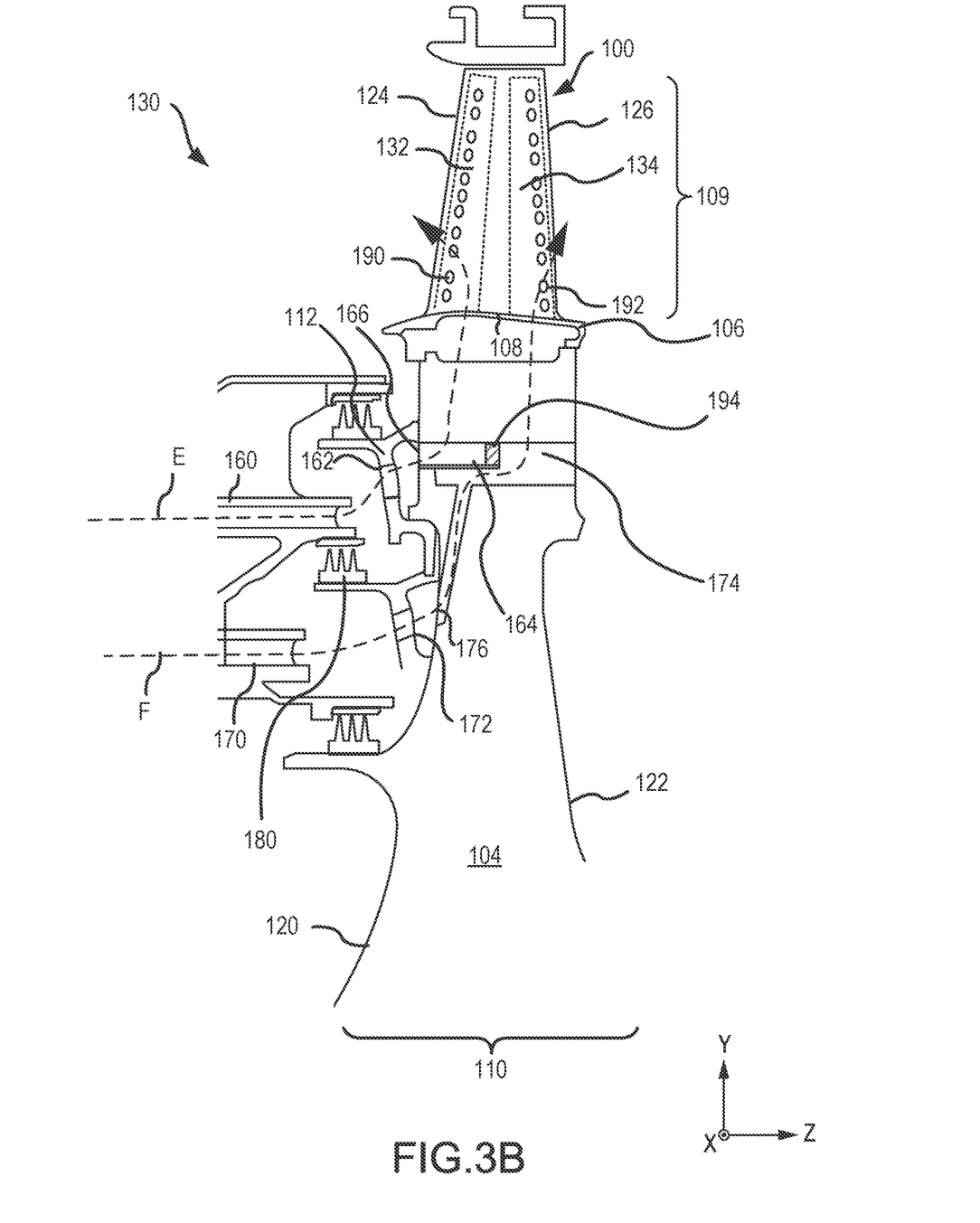

In various embodiments and with reference to FIGS. 3A and 3B and still to FIG. 2, a rotor assembly 110 may comprise a cooling system 130 having a first airflow path E and a second airflow path F. Cooling system 130 may be located in any suitable position within gas turbine engine 20.

In various embodiments, cooling system 130 may be configured to provide multiple airflow paths to deliver cooling airflow to an airfoil 100. With brief reference to FIG. 1, the airflow may originate from any suitable source in gas turbine engine 20. For example, the airflow may comprise air received from a compressor section of gas turbine engine 20.

Returning to FIGS. 3A and 3B, a first airflow may be directed along first airflow path E to provide cooling air to a first portion, such as the leading edge 124, of airfoil 100. A second airflow may be directed along second flowpath F to provide cooling air to a second portion, such as the trailing edge 126, of airfoil 100. Cooling system 130 may be configured to convectively remove heat from the airfoil 100 by the cooling airflow along first flowpath E and second flowpath F. The first flowpath E may be defined in part by a flow guide 150, which may be an inner diffuser case, disposed radially inward of first flowpath E and upstream of disk 104. The first flowpath E may be defined by a flow guide 152, such that first flowpath E is defined between flow guide 150 and flow guide 152. The second flowpath F may be defined in part by a flow guide 150 disposed radially outward of second flowpath F. The second flowpath F may be defined by a radially inner flow guide 154, such that second flowpath F is defined between flow guide 150 and radially inner flow guide 154. First flowpath E and second flowpath F may flow generally axially toward the rotor assembly 110, or generally, toward airfoil 100.

First airflow path E may be directed through a nozzle to introduce a swirl or tangential velocity into the first airflow path E, which is directed toward airfoil 100 of rotor assembly 110. In various embodiments, cooling airflow may be directed through a tangential onboard injector (TOBI), which may direct the cooling airflow toward rotating components, such as rotor assembly 110. A TOBI may comprise an airfoil, and/or the like, configured to rotate the cooling airflow circumferentially before expelling the airflow towards rotor assembly 110. A TOBI may be configured to spin an airflow to a velocity that closely matches and/or is substantially the same as the linear velocity of a rotating component (e.g., rotor assembly 110), thereby limiting the temperature increase between the airflow path and the rotating component.

In that regard, the first airflow path E may be directed into a first TOBI 160. First TOBI 160 may be configured to receive the airflow of the first airflow path E and expel the airflow towards cover plate 112, such that first airflow path E exiting first TOBI 160 has a tangential velocity component to the cooling airflow. Cover plate 112 may control airflow to axially forward surface 120 of disk 104. Generally, first airflow path E may enter disk 104 and flow radially outward through disk 104, root 106, and into first cooling chamber 132 of airfoil body 109.

In various embodiments, second airflow path F may be directed through a nozzle to introduce a swirl or tangential velocity into the second airflow path F, which is directed toward airfoil 100 of rotor assembly 110. Second airflow path F may be directed into a second TOBI 170. Second TOBI 170 may be configured to receive the airflow of second airflow path F and expel the airflow towards cover plate 112. Second airflow path F exiting second TOBI 170 may have a tangential velocity component to the cooling airflow. Generally, second airflow path F may enter disk 104 and flow radially outward through disk 104, root 106, and into second cooling chamber 134 of airfoil body 109.

The first airflow path E and the second airflow path F may have similar or different temperatures and/or pressures. The first airflow path E may have a higher pressure than the second airflow path F.

In various embodiments, a seal 180 may be disposed forward of disk 104 and between first airflow path E and second airflow path F. Seal 180 may be configured to fluidly isolate first airflow path E and second airflow path F. Seal 180 may be a non-contacting dynamic seal, a "W" seal (e.g. a seal having a "W"-shaped cross-section or that forms a "W" shape), a brush seal, a rope seal, a "C" seal (e.g. a seal having a "C"-shaped cross-section or that forms a "C" shape), a crush seal, a flap seal, a feather seal, a knife-edge seal, or other suitable seal. Seal 180 may comprise a continuous annular ring or may have at least one circumferential split.

Turning to FIG. 3B, first airflow path E may exit first TOBI 160 and may flow axially aft toward disk 104. First airflow path E may flow through a first aperture 162 defined in cover plate 112. First airflow path E may enter disk 104 through a passage 164 defined within disk 104. An inlet 166 of passage 164 may be defined in axially forward surface 120 of disk 104. First TOBI 160 may be configured to direct the first airflow path E into the inlet 166. Passage 164 may extend axially partially or completely through disk 104 and may further define first airflow path E through disk 104. Passage 164 may redirect the first airflow path E from flowing in an axial direction, such as the positive z-direction, to flowing in a radial direction, such as the positive y-direction. In that regard, passage 164 may direct first airflow path E radially outward toward airfoil 100 and into root 106. The first airflow path E may enter first cooling chamber 132 of airfoil 100 through an aperture in root 106. First airflow path E may be directed through airfoil 100 and may exit the leading edge 124 of airfoil 100 through a plurality of holes 190 defined in the leading edge 124 of airfoil 100.

The second airflow path F may exit second TOBI 170 and may flow axially aft toward disk 104. The second airflow path F may flow through a second aperture 172 defined in cover plate 112. Second airflow path F may enter disk 104 through a passage 174 defined within disk 104. An inlet 176 of passage 174 may be defined in axially forward surface 120 of disk 104. Second TOBI may be configured to direct the second airflow path F into the second inlet 176. Passage 174 may extend axially partially or completely through disk 104 and may further define the second airflow path F through disk 104. Passage 174 may redirect the second airflow path F from flowing in an axial direction, such as the positive z-direction, to flowing in a radial direction, such as the positive y-direction. In that regard, passage 174 may direct second airflow path F radially outward toward airfoil 100 and into root 106. The second airflow path F may enter second cooling chamber 134 of airfoil 100 through an aperture in root 106. Second airflow path F may be directed through airfoil 100 and may exit the trailing edge 126 of airfoil 100 through a plurality of holes 192 defined in the trailing edge 126 of airfoil 100.

In various embodiments, passage 164 and passage 174 may be formed as separate passages or as a single passage separated by a baffle 194. Baffle 194 may be disposed within passage 164 and/or passage 174 to fluidly isolate the first airflow path E from the second airflow path F. Baffle 194 may be configured to extent axially and/or radially within disk 104 and between first airflow path E and second airflow path F.

Figure 4:
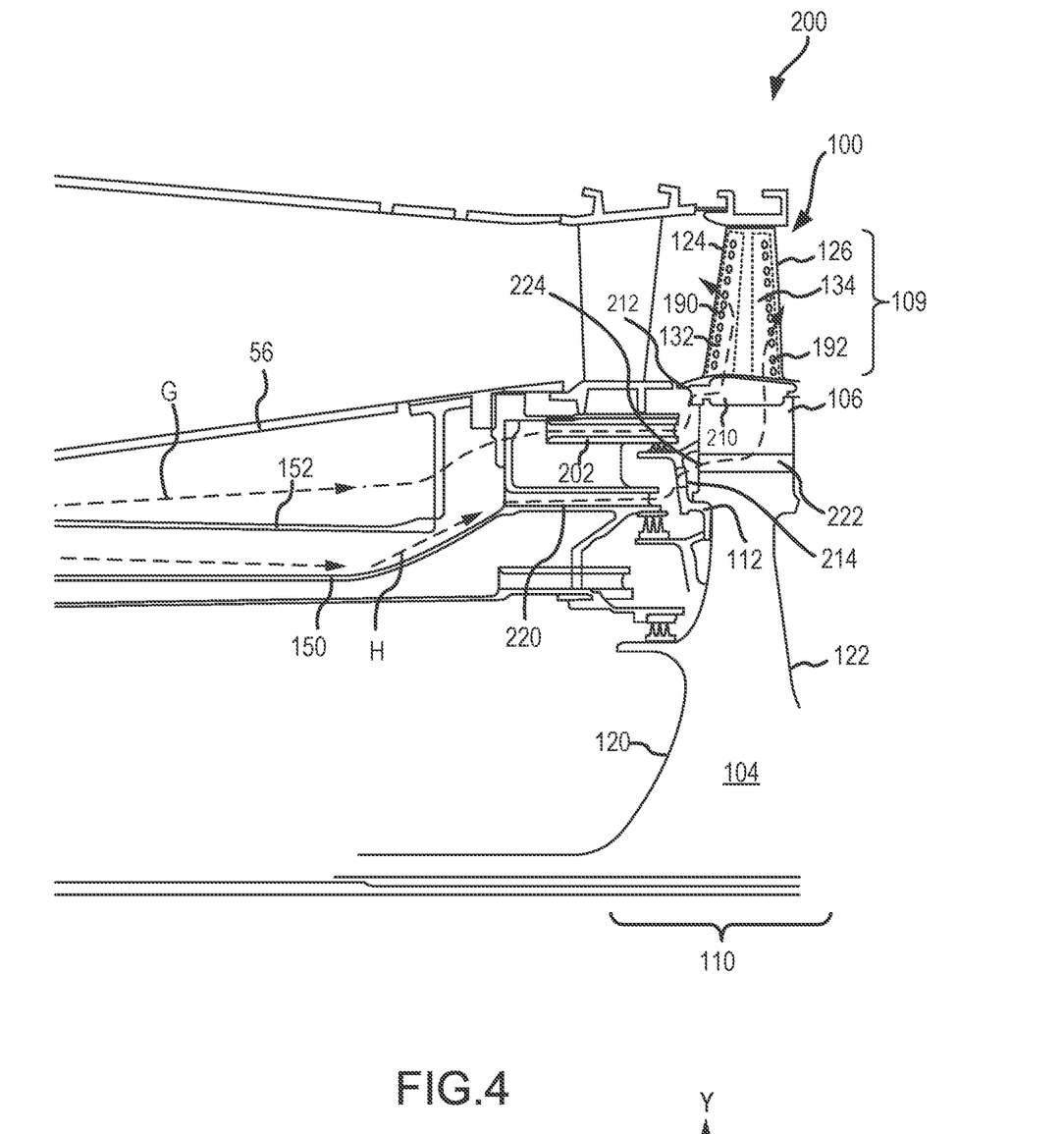
FIG. 4 illustrates a cross-sectional view of a cooling system for an airfoil, in accordance with various embodiments.

With reference to FIG. 4, a cooling system 200 defining a first airflow path G and a second airflow path H is shown in accordance with various embodiments. A first airflow may be directed along first airflow path G to provide cooling air to a first portion, such as the leading edge 124, of airfoil 100. A second airflow may be directed along second airflow path H to provide cooling air to a second portion, such as the trailing edge 126, of airfoil 100. The first airflow path G may be defined in part by a flow guide 152 disposed radially inward of first airflow path G and upstream of disk 104. The first airflow path G may be further defined by a radially inner surface of combustor 56, such that first airflow path G is defined between flow guide 152 and combustor 56. The second airflow path H may be defined in part by a flow guide 150, which may be an inner diffuser case, and by flow guide 152 which may be disposed radially outward of second airflow path H. Thus, the second airflow path H may be defined between flow guide 150 and flow guide 152. First airflow path G and second airflow path H may flow generally axially toward airfoil 100.

First airflow path G may be directed through a nozzle to introduce a swirl or tangential velocity into the first airflow path G, which is directed toward airfoil 100 of rotor assembly 110. In that regard, the first airflow path G may be directed into a first TOBI 202. First TOBI 202 may be configured to receive the airflow of the first airflow path G and expel the airflow towards airfoil 100, or more specifically, root 106. Thus, the first airflow path G may be directed into root 106. Generally, first airflow path G may enter root 106 and flow radially outward through root 106 and into first cooling chamber 132 of airfoil body 109. A passage 210 may be formed in root 106. Passage 210 may include a first inlet 212 defined in an axially forward surface of the root 106. Passage 210 may redirect first airflow path G from flowing in an axial direction, such as the positive z-direction, to flowing in a radial direction, such as the positive y-direction. In that regard, passage 210 may direct first airflow path G radially outward through root 106 and into airfoil 100. First airflow path G may enter first cooling chamber 132 of airfoil 100 through an aperture in root 106. First airflow path G may be directed through airfoil 100 and may exit the leading edge 124 of airfoil 100 through a plurality of holes 190 defined in the leading edge 124 of airfoil 100.

The second airflow path H may be directed into a second TOBI 220. The second TOBI 220 may be configured to receive the airflow of second airflow path H and expel the airflow towards cover plate 112. Generally, second airflow path H may enter disk 104 and flow radially outward through disk 104, root 106, and into second cooling chamber 134 of airfoil 100. The second airflow path H may exit second TOBI 220 and may flow axially aft toward disk 104. The second airflow path H may flow through an aperture 214 defined in cover plate 112. Second airflow path H may enter disk 104 through a passage 222 defined within disk 104. An inlet 224 of passage 222 may be defined in axially forward surface 120 of disk 104. Second TOBI 220 may be configured to direct the second airflow path H into the inlet 224. Passage 222 may extend axially partially or completely through disk 104 and may further define second airflow path H through disk 104. Passage 222 may redirect the second airflow path H from flowing in an axial direction, such as the positive z-direction, to flowing in a radial direction, such as the positive y-direction. In that regard, passage 222 may direct second airflow path H radially outward toward airfoil 100 and into root 106. The second airflow path H may enter second cooling chamber 134 of airfoil 100 through an aperture in root 106. Second airflow path H may be directed through airfoil 100 and may exit the trailing edge 126 of airfoil 100 through a plurality of holes 192 defined in the trailing edge 126 of airfoil 100.

In various embodiments, the first airflow path G and the second airflow path H may have similar or different temperatures and/or pressures. First airflow path G may have a higher pressure than the second airflow path H.

Figure 5:
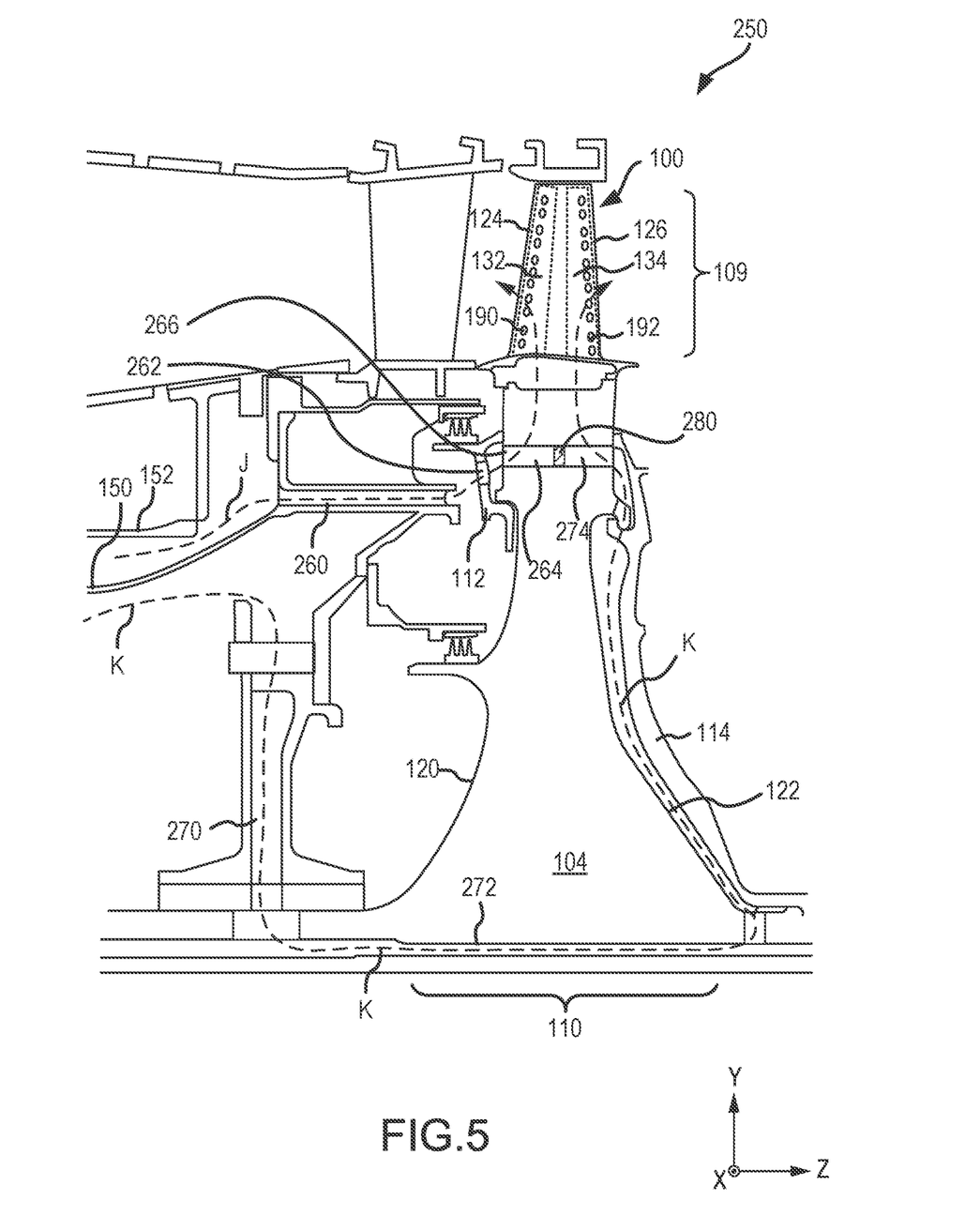
FIG. 5 illustrates a cross-sectional view of a cooling system for an airfoil, in accordance with various embodiments.

With reference to FIG. 5, a cooling system 250 defining a first airflow path J and a second airflow path K is shown in accordance with various embodiments. A first airflow may be directed along first airflow path J to provide cooling air to a first portion of airfoil 100, such as the leading edge 124 of airfoil 100. First airflow path J may be defined in part by a flow guide 150, which may be an inner diffuser case, disposed radially inward of first airflow path J. First airflow path J may be defined by a flow guide 152, such that first airflow path J is defined between flow guide 150 and flow guide 152. First airflow path J may flow generally axially toward airfoil 100.

A second airflow may be directed along second airflow path K to provide cooling air to a second portion of airfoil 100, such as the trailing edge 126 of airfoil 100. Generally, second airflow path K may be directed axially aft, and radially inward around disk 104 and radially outward along an axially aft surface 122 of disk 104. The second airflow path K may be defined in part by a flow guide 150 disposed radially outward of second airflow path K.

In various embodiments, first airflow path J may be directed through a nozzle to introduce a swirl or tangential velocity into the first airflow path F, which is directed toward airfoil 100 of rotor assembly 110. In that regard, first airflow path J may be directed into a TOBI 260. The TOBI 260 may be configured to receive the airflow of first airflow path J and expel the airflow towards cover plate 112. Generally, first airflow path J may enter disk 104 and flow radially outward through disk 104, root 106, and into first cooling chamber 132 of airfoil 100. The first airflow path J may exit TOBI 260 and may flow axially aft toward disk 104. First airflow path J may flow through an aperture 262 defined in cover plate 112. First airflow path J may enter disk 104 through a first passage 264 defined within disk 104. An inlet 266 of first passage 264 may be defined in axially forward surface 120 of disk 104. TOBI 260 may be configured to direct the first airflow path J into the inlet 266. First passage 264 may direct first airflow path J radially outward toward airfoil 100 and into root 106. The first airflow path J may enter first cooling chamber 132 of airfoil 100 through an aperture in root 106. First airflow path J may be directed through airfoil 100 and may exit the leading edge 124 of airfoil 100 through a plurality of holes 190 defined in the leading edge 124 of airfoil 100.

Second airflow path K may be directed through a nozzle, which may further define or direct the second airflow path K. In various embodiments, cooling airflow may be directed through a radial onboard injector (ROBI). A ROBI may include a plurality of injector blades between at least two walls and may direct the airflow. The second airflow path K may be directed into a ROBI 270. ROBI 270 may disposed in the second airflow path K forward of the disk 104 and configured to direct the second airflow path K radially inward. While radially inward of disk 104, second airflow path K may flow axially aft along an inner surface 272 of disk 104, toward the axially aft surface 122 of disk 104. Second airflow path K may be directed radially outward between minidisk 114 and the axially aft surface 122 of the disk 104. Second airflow path K may enter disk 104 through a second passage 274 defined within disk 104. An inlet 276 of second passage 274 may be defined in axially aft surface 122 of disk 104. Second passage 274 may extend axially partially or completely through disk 104 and may further define second airflow path K through disk 104. Second passage 274 may redirect the second airflow path K from flowing in an axial direction, such as the negative z-direction, to flowing in a radial direction, such as the positive y-direction. In that regard, passage 274 may direct second airflow path K radially outward toward airfoil 100 and into root 106. Second airflow path K may enter second cooling chamber 134 of airfoil 100 through an aperture in root 106. Second airflow path K may be directed through airfoil 100 and may exit the trailing edge 126 of airfoil 100 through a plurality of holes 192 defined in the trailing edge 126 of airfoil 100.

In various embodiments, first passage 264 and second passage 274 may be formed as separate passages or as a single passage separated by a baffle 280. Baffle 280 may be disposed within first passage 264 and second passage 274 to fluidly isolate the first airflow path J from the second airflow path K. In various embodiments, the airflow of first airflow path J and the airflow of second airflow path K may have similar or different temperatures and/or pressures. First airflow path J may have a higher pressure than the second airflow path K.

Figure 6:
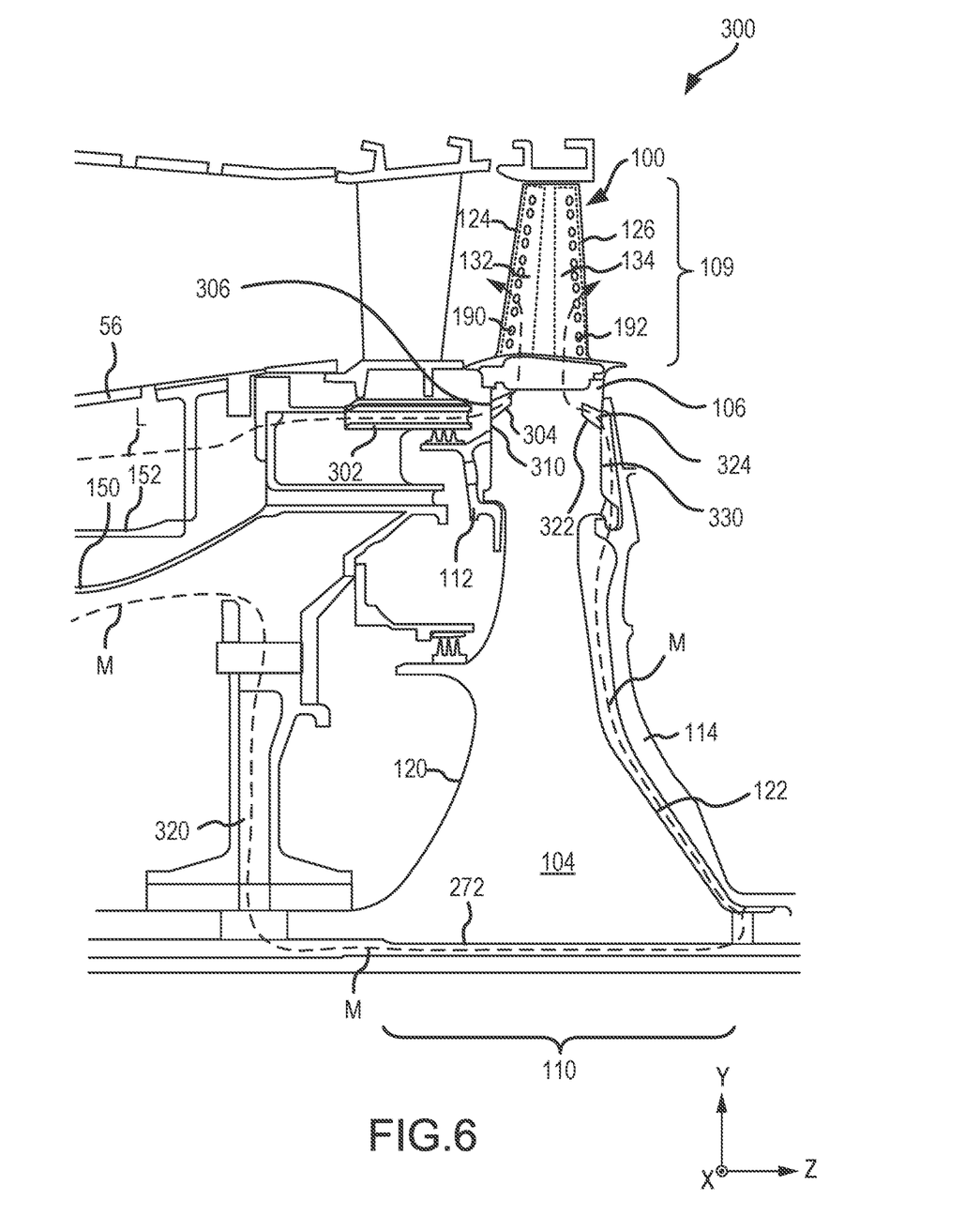
FIG. 6 illustrates a cross-sectional view of a cooling system for an airfoil, in accordance with various embodiments.

With reference to FIG. 6, a cooling system 300 defining a first airflow path L and a second airflow path M is shown in accordance with various embodiments. A first airflow may be directed along first airflow path L to provide cooling air to a first portion, such as the leading edge 124, of airfoil body 109. First airflow path L may flow generally axially toward airfoil 100 of rotor assembly 110. First airflow path L may be defined in part by a flow guide 152 disposed radially inward of first airflow path L and upstream of disk 104. First airflow path L may be further defined by a radially inner surface of combustor 56, such that first airflow path L is defined between flow guide 152 and combustor 56.

A second airflow may be directed along second airflow path M to provide cooling air to a second portion, such as the trailing edge 126, of airfoil body 109. Generally, second airflow path M may be directed axially aft, and radially inward around disk 104 and radially outward along an axially aft surface 122 of disk 104. The second airflow path M may be defined in part by a flow guide 150 disposed radially outward of second airflow path M.

In various embodiments, first airflow path L may be directed through a nozzle to introduce a swirl or tangential velocity into the first airflow path L, which is directed toward airfoil 100 of rotor assembly 110. In that regard, the first airflow path L may be directed into a TOBI 302. TOBI 302 may be configured to receive the airflow of the first airflow path L and expel the airflow towards airfoil 100, or more specifically, root 106. Thus, the first airflow path L may be directed into root 106. Generally, first airflow path L may enter root 106 and flow radially outward through root 106 and into first cooling chamber 132 of airfoil body 109. A first passage 304 may be formed in root 106. First passage 304 may include an inlet 306 defined in an axially forward surface 310 of the root 106. First passage 304 may redirect first airflow path L from flowing in an axial direction, such as the positive z-direction, to flowing in a radial direction, such as the positive y-direction. In that regard, first passage 304 may direct first airflow path L radially outward through root 106 and into airfoil body 109. First airflow path L may enter first cooling chamber 132 of airfoil 100 through an aperture in root 106. First airflow path L may be directed through airfoil 100 and may exit the leading edge 124 of airfoil 100 through a plurality of holes 190 defined in the leading edge 124 of airfoil body 109.

In various embodiments, second airflow path M may be directed through a nozzle, which may further define or direct the second airflow path M. In that regard, the second airflow path M may be directed into a ROBI 320. ROBI 320 may disposed in the second airflow path M forward of the disk 104 and configured to direct the second airflow path M radially inward. While radially inward of disk 104, second airflow path M may flow axially aft along an inner surface 272 of disk 104, toward the axially aft surface 122 of disk 104. Second airflow path M may be directed radially outward between minidisk 114 and the axially aft surface 122 of the disk 104. Second airflow path M may be directed into root 106. Generally, second airflow path M may enter root 106 and flow radially outward through root 106 and into second cooling chamber 134 of airfoil body 109. A second passage 322 may be formed in root 106. Second passage 322 may include an inlet 324 defined in an aft forward surface 330 of the root 106. Second passage 322 may direct second airflow path M radially outward toward airfoil 100 and into root 106. Second airflow path M may enter second cooling chamber 134 of airfoil 100 through an aperture in root 106. Second airflow path M may be directed through airfoil 100 and may exit the trailing edge 126 of airfoil 100 through a plurality of holes 192 defined in the trailing edge 126 of airfoil 100.

In various embodiments, the airflow of first airflow path L and the airflow of second airflow path M may have similar or different temperatures and/or pressures. First airflow path L may have a higher pressure than the second airflow path M.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil, comprising:
   a root;
   an airfoil body radially outward of the root, the airfoil body defining a first cooling chamber and a second cooling chamber;
   a first passage defined within the root and configured to direct a first airflow received from a tangential onboard injector (TOBI) radially outward through the root into the first cooling chamber; and
   a second passage defined within the root and configured to direct a second airflow received from a radial onboard injector (ROBI) radially outward through the root and into the second cooling chamber,
   wherein the TOBI is disposed radially outward from the ROBI, and
   the first cooling chamber is disposed forward from the second cooling chamber.

2. The airfoil of claim 1, further comprising a first inlet defined in an axially forward surface of the root.

3. The airfoil of claim 2, further comprising a second inlet defined in an axially aft surface of the root.

4. The airfoil of claim 3, further comprising a leading edge and a trailing edge, wherein the first cooling chamber is disposed at the leading edge and the second cooling chamber is disposed at the trailing edge.

5. The airfoil of claim 4, wherein the airfoil body defines a first plurality of holes at the leading edge, and wherein the first airflow is directed out the airfoil through the first plurality of holes.

6. The airfoil of claim 5, wherein the airfoil body defines a second plurality of holes at the trailing edge, and wherein the second airflow is directed out the airfoil through the second plurality of holes.

7. The airfoil of claim 1, wherein the airfoil comprises a blade.

8. An engine section of a gas turbine engine, comprising:
   a disk configured to rotate about an axis;
   a blade coupled to the disk, the blade defining a first cooling chamber and a second cooling chamber;
   a first flow guide disposed upstream of the disk, the first flow guide defining a first airflow path and a second airflow path;
   a first passage configured to direct the first airflow path to the first cooling chamber;
   a second passage configured to direct the second airflow path to the second cooling chamber;
   a tangential onboard injector (TOBI) disposed in the first airflow path; and
   a radial onboard injector (ROBI) disposed in the second airflow path,
   wherein the TOBI is disposed radially outward from the ROBI, and
   the first cooling chamber is disposed forward from the second cooling chamber.

9. The engine section of claim 8, wherein the first passage includes a first inlet defined in an axially forward surface of the disk, the TOBI configured to direct the first airflow path into the first inlet.

10. The engine section of claim 9, wherein the second passage includes a second inlet defined in an axially aft surface of the disk, the ROBI configured to direct the second airflow path into the second inlet.

11. The engine section of claim 8, wherein the first passage includes a first inlet defined in an axially forward surface of a root.

12. The engine section of claim 8, wherein the second passage includes a second inlet defined in an axially aft surface of the disk.

13. The engine section of claim 8, further comprising a minidisk coupled to an axially aft surface of the disk, wherein the second airflow path is directed radially outward between the minidisk and the axially aft surface of the disk.

14. The engine section of claim 8, wherein the blade defines a first plurality of holes at a leading edge, and wherein the first airflow path is directed out the blade through the first plurality of holes.

15. A gas turbine engine, comprising:
    a compressor section configured to supply airflow to at least one of a first airflow path or a second airflow path;
    a turbine section configured to receive airflow from the first airflow path and the second airflow path, the turbine section comprising:
    a disk configured to rotate about an axis;
    a blade coupled to the disk, the blade defining a first cooling chamber and a second cooling chamber;
    a first passage configured to direct a first airflow path to the first cooling chamber;
    a second passage configured direct the second airflow path to the second cooling chamber;
    a tangential onboard injector (TOBI) disposed in the first airflow path; and
    a radial onboard injector (ROBI) disposed in the second airflow path,
    wherein the TOBI is disposed radially outward from the ROBI, and
    the first cooling chamber is disposed forward from the second cooling chamber.

16. The gas turbine engine of claim 15, further comprising:
    a first flow guide disposed upstream of the disk, the first flow guide defining the first airflow path and the second airflow path; and
    wherein the first passage includes a first inlet defined in an axially forward surface of the disk, the TOBI configured to direct the first airflow path into the first inlet.

17. The gas turbine engine of claim 16, wherein the second passage includes a second inlet defined in an axially aft surface of the disk, the ROBI configured to direct the second airflow path into the second inlet.

18. The gas turbine engine of claim 16, wherein the ROBI is configured to direct the second airflow path radially inward.

19. The gas turbine engine of claim 18, further comprising a minidisk coupled to an axially aft surface of the disk, wherein the second airflow path is directed radially outward between the minidisk and the axially aft surface of the disk.

* * * * *